(12) United States Patent
Smith et al.

(10) Patent No.: US 10,771,421 B2
(45) Date of Patent: Sep. 8, 2020

(54) SYSTEMS AND METHODS FOR FAIR INFORMATION EXCHANGE USING PUBLISH-SUBSCRIBE WITH BLOCKCHAIN

(71) Applicant: Intel Corporation, Santa Clara, CA (US)

(72) Inventors: Ned M. Smith, Beaverton, OR (US); Michael Nolan, Maynooth (IE); Davide Carboni, London (GB)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 15/475,317

(22) Filed: Mar. 31, 2017

(65) Prior Publication Data

US 2018/0287915 A1   Oct. 4, 2018

(51) Int. Cl.
*H04L 29/08* (2006.01)
*H04L 12/58* (2006.01)

(52) U.S. Cl.
CPC .............. *H04L 51/22* (2013.01); *H04L 51/30* (2013.01)

(58) Field of Classification Search
CPC .................................................. H04L 43/0817
See application file for complete search history.

(56) References Cited

U.S. PATENT DOCUMENTS

| | | | |
|---|---|---|---|
| 2002/0049601 A1* | 4/2002 | Asokan | G06Q 30/06 705/80 |
| 2016/0028552 A1 | 1/2016 | Spanos et al. | |
| 2016/0277272 A1* | 9/2016 | Peach | H04L 43/106 |
| 2016/0358135 A1* | 12/2016 | Liao | G06Q 20/10 |

OTHER PUBLICATIONS

International Searching Authority, "International Search Report," issued in connection with International Patent Application No. PCT/US2018/017820, dated Jun. 21, 2018, 3 pages.
International Searching Authority, "Written Opinion," issued in connection with International Patent Application No. PCT/US2018/017820, dated Jun. 21, 2018, 9 pages.
Sayed Hadi Hashemi et al., "World of Empowered IoT Users," Internet-of-Things Design and Implementation (IoTDI), 1016 IEEE First International Conference on, May 19, 2016, ISBN 978-1-4673-9942 8-7, pp. 13-24.
International Bureau, "International Preliminary Report on Patentability," issued in connection with PCT patent application No. PCT/US2018/017820, dated Oct. 10, 2019, 11 pages.

* cited by examiner

*Primary Examiner* — Adnan M Mirza
(74) *Attorney, Agent, or Firm* — Hanley, Flight and Zimmerman, LLC

(57) ABSTRACT

Methods, apparatus, systems and articles of manufacture are disclosed to facilitate information exchange using publish-subscribe with blockchain. An example apparatus includes a broker including a processor and a distributed ledger module. The example distributed ledger module stores a message to be relayed by the broker from a publisher to a subscriber. The example processor is to at least compute, triggered by receipt of the message by the broker, a proof-of-work (PoW) function. The example processor is to at least verify the computation of the PoW function. The example processor is to at least transmit, upon verifying the computation of the PoW function, the message to the subscriber. The example processor is to at least process feedback received by the broker to update the PoW function.

35 Claims, 8 Drawing Sheets

SYSTEMS AND METHODS FOR FAIR INFORMATION EXCHANGE USING PUBLISH-SUBSCRIBE WITH BLOCKCHAIN

FIELD OF THE DISCLOSURE

This disclosure relates generally to fair information exchange, and, more particularly, to methods and apparatus for fair information exchange using publish-subscribe with blockchain.

BACKGROUND

Information flows freely and in large quantities in computing systems and network. Much information, however, degrades quickly in value as the information ages, even in minutes or milliseconds. Time-sensitive information benefits those who receive the information first, providing an advantage to early receivers and a disadvantage to entities who receive the information later.

DETAILED DESCRIPTION

Figure 1:
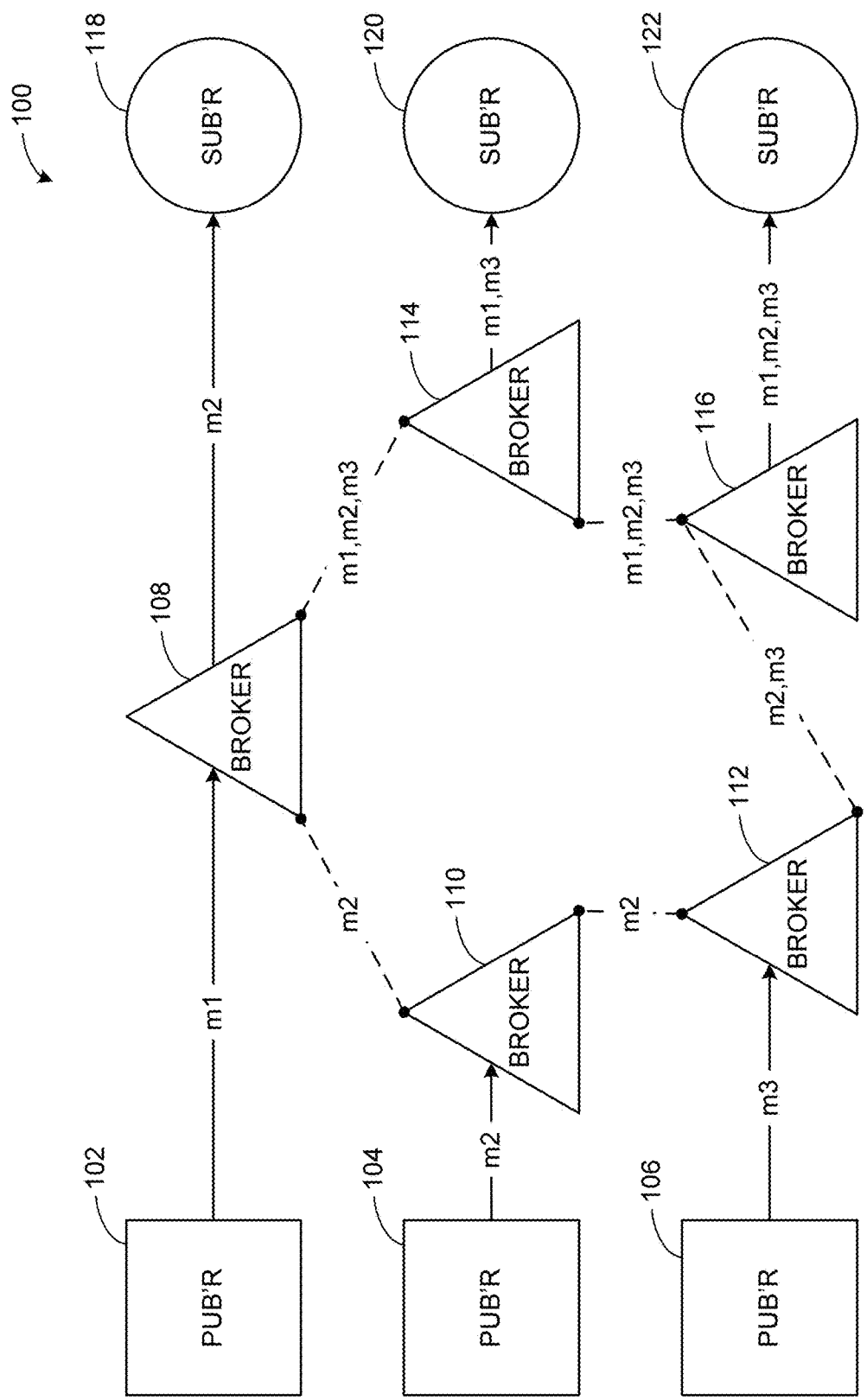
FIG. 1 depicts an example system conceptual model in which publishers produce messages shared among broker nodes forming a blockchain in which some of the broker nodes host subscribers that subscribe to a subset of the ticker messages.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Blockchain technology is a distributed computing mechanism designed to provide a degree of fairness such that one entity is not advantaged while another entity is disadvantaged. A blockchain is a distributed, public ledger of transactions (e.g., financial transactions, data transactions, etc.) in which the transactions are recorded publicly and chronologically and can be verified by participants without a central authority. Blockchain applies cryptographic algorithms to a shared or distributed database to allow any user to read the database, add to the database, and to help ensure no single user can control what is written to the distributed database. Any blockchain user can view all transactions with respect to the distributed database. Blockchain technology provides disintermediation to reduce intermediaries in communication between data producers and data consumers, for example. That is, rather than engaging a middleman to facilitate a transaction, two entities (e.g., a data consumer and a data supplier) can connect and engage in a transaction directly. Other entities can see the transaction, so the blockchain serves as a distributed consensus engine for the entities to verify and/or otherwise agree to the existence of the transaction.

In blockchain-based technology, a log of transactions is processed by a distributed system of message brokers. The message brokers are a set of distributed entities that agree on a present state of transaction processing and a historical state of transaction processing. A transaction processing log is protected with a cryptographic hash, for example, and each broker has a copy of the transaction processing log. The blockchain of distributed entities also provides an algorithm to synchronize processing of each transaction. Synchronized processing helps to ensure fairness among brokers.

For example, when an entity seeks to add information to the blockchain, participating entities, which all have copies of the existing blockchain, run algorithms to evaluate and verify the proposed addition (e.g., the proposed transaction). If a majority of participating entities agree that the addition is valid (e.g., matches the blockchain's history, etc.), then the addition becomes a new block in the blockchain, viewable by the participating entities. A copy of the updated blockchain is conveyed to each participating entity so each entity can see the transaction and has an up-to-date copy of the blockchain log of transactions.

Certain examples apply a proof of work (PoW, also referred to as proof of waiting) as a component of an algorithm to help ensure fairness. Using the PoW, each participating entity executes an algorithm to confirm a digital signature attached to each block to verify each transaction. The PoW can be applied to help guarantee that each node is able to receive and process the transaction to help guarantee a certain delivery time that is at least approximately the same for all brokers participating on a network.

While a PoW function can be used to deter an entity from sending too many communications, a PoW function can also be used to help ensure more equal delivery of information to participating entities. For example, executing a PoW function to compute a hash value can occupy entities for message receipt and produce a verifiable value (e.g., the hash) that can be checked by other participating entities to ensure the validity of the entity computing the PoW.

In certain examples, for information that has a high value but degrades quickly over time, the entity that knows the information first before other entity(-ies) can act quickly to the advantage of the early receiving entity and the disadvantage of late receiving entity(-ies). Certain examples apply PoW with an algorithm to help ensure that information is delivered at the same time (or approximately the same time given differences in latency, bandwidth, processing ability, etc., among participating entities) for all members of the blockchain.

Stock tickers are an example of information whose value degrades (sometimes sharply) after the information becomes known. However, the stock ticker information may have tremendous value moments after the information is made known. Press releases, pricing of commodities, currency exchange rates, interests rate changes, initial public offerings, legal decisions affecting multi-national corporations, wiki leaks information, etc., follow this pattern.

Historically, people have relied on news reporting organizations such as Reuters, broadcast radio and television or private sources such as a stock exchange. The Internet has increasingly become an alternative information distribution system that augments or competes with historical information outlets. Unlike broadcast networks, such as satellite television, the Internet is largely a store-and-forward delivery mechanism that can take hours or days for messages to propagate globally. Internet Protocol (IP) communications, such as IPv4 and IPv6, have support for bandwidth reservations and latency guarantees. However, these functions do not guarantee unbiased synchronized delivery of a message to all global subscribers. Consequently, some people and systems become aware of time-sensitive information at different times, rather than approximately the same time. The difference in timing unfairly favors some information consumers over others.

The emerging Internet-of-Things (IoT) infrastructure relies on RESTful and Publish-Subscribe messaging models, for example, to deliver store-and-forward information at scale. However, different publication strategies may be employed such as IP multi-cast, iterated unicast and parallel unicast. There may be nested and proxied message delivery infrastructures having multiple intermediate hops. Certain examples provide a fairer method to allow the Internet to be a fairer information distribution channel.

Certain examples build publish-subscribe message services around a blockchain of message brokers that cooperate to synchronize the publication of information by relying on a PoW function that prohibits low latency brokers from publishing too early and accommodates high latency brokers with a lower cost PoW function.

When all brokers are in possession of the "to be published" information, the brokers agree on a time to publish and then publish the information to their subscribers on cue. Brokers can use IP bandwidth reservation, latency quotas, and other features to help guarantee that message delivery latencies are approximately the same (within some accepted tolerance threshold).

In certain examples, network topology can introduce message delivery latencies as the message hops from one intermediate broker to the next intermediate broker. In other examples, dynamics are factored out as each end-point broker is to acknowledge receipt of the message to be published.

In certain examples, blockchain applies a simple majority consensus method to allow a message block to progress. In other examples, a 100% consensus among participating nodes (e.g., brokers) is applied to help ensure that no broker wishing to participate is ignored.

Using some publish-subscribe notification mechanisms, an independent routing fabric provider can performance optimize (possibly at higher cost) message delivery favoring subscribers who are willing to pay more. This optimization may be against the publisher's wishes because the publisher intends for the message to be non-biased. Certain examples support independent fabric providers so they are not motivated to bias based on ability to pay (e.g., against the data owners' desires).

In certain examples, PoW methods can be used with data miners to calibrate a rate at which blocks can be submitted for clearing and introduce a work factor that increases and/or decreases in difficulty based on how miners perform relative to a time period (e.g., a two week running average, etc.). In certain examples, broker message delivery constraints are factored into a calibration equation.

Thus, in certain examples, a message broker function (e.g., reception and delivery of messages, etc.) can be distributed across a blockchain to provide "fair" or balanced delivery of messages to entities or nodes in the system. For example, nodes can be implemented with the message broker function using an application-specific integrated circuit (ASIC), field-programmable gate array (FPGA), central processing unit (CPU), embedded system, network function virtualization (NFV), and/or other chipset, computing system, etc. For example, the message broker function can be distributed to run on nodes that are part of a network infrastructure in which network infrastructure equipment implements the messaging algorithm with routing nodes facilitating the blockchaining with distributed computing as a virtual private network (VPN). Using a PoW function that incorporates and/or accounts for a publish-subscribe message delivery latency based on node location in a network graph, messages can be delivered to a subscriber base across multiple message brokers without favoring/biasing a subset of the subscriber base (e.g., makes delivery "fair").

Thus, certain examples disclosed herein are directed to a distributed computing model for delivering messages from publishers to describers via brokers without reliance on a central node or other centralized communication model. Certain examples disclosed herein improve computer functionality and network communication reliability by helping to ensure fair distribution and relay of messages. Certain examples disclosed herein help to alleviate issues with unfair, early access to information, drain on network resources, uneven transmission of data, and message delivery reliability issues.

FIG. 1 depicts an example system conceptual model of a network 100 in which a set of publishers 102, 104, 106 produce messages (e.g., stock ticker messages m1, m2, m3, etc.), respectively, that are shared among a collection of broker nodes 108, 110, 112, 114, 116 forming a blockchain in which some of the broker nodes 108-116 host subscribers 118, 120, 122 that subscribe to a subset of the ticker messages m1, m2, m3.

The system 100 of brokers 108-116 helps to guarantee fair notification of the ticker messages m1, m2, m3 by helping to ensure that each broker 108-116 is given a proof-of-work function designed to control for latencies associated with the receipt and delivery of each ticker message m1, m2, m3.

Brokers 108-116 that are farther away from publishers 102-106 and/or subscribers 118-122 may realize a PoW function that is weaker (e.g., takes less time to evaluate) than a broker 108-116 that is closer to its publisher/subscriber community. An overall effect of a PoW calculation tuned to each endpoint broker 108-116 is that the brokers 108-116 will be ready to publish ticker messages m1, m2, m3 at the same time (and do not depend on synchronized clocks, trusted time or a central time server), for example.

Figure 2:
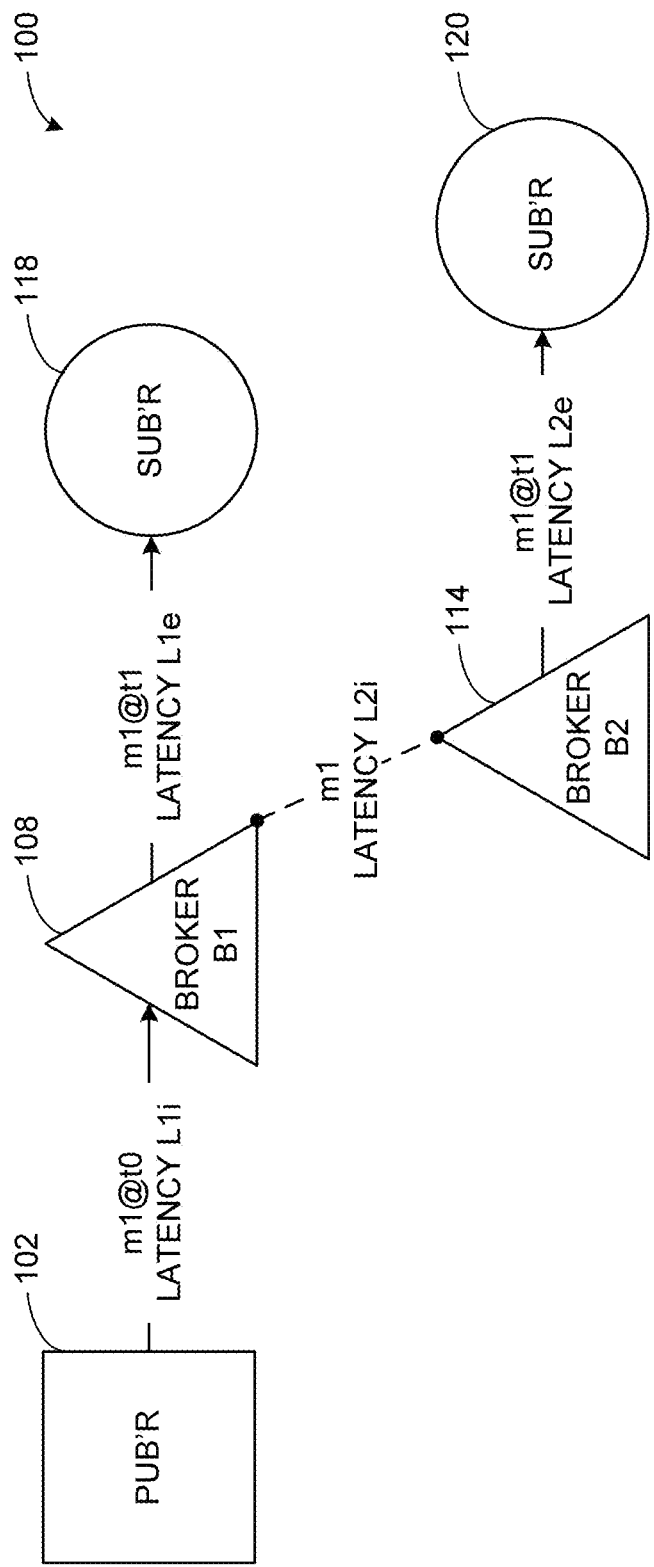
FIG. 2 illustrates a detailed view of a portion of the example network of FIG. 1 including example broker, publisher, and subscriber relationships.

FIG. 2 illustrates a detailed view of a portion of the example network 100 including example relationships among the brokers 108, 114, publisher 102, and subscribers 118, 120. FIG. 2 depicts a portion of the system 100 with example ingress and egress latencies corresponding to each broker 108, 114. An ingress latency is based on a time for message delivery from the publisher 102 to the brokers B1 108 and B2 114. In certain examples, such as the example of FIG. 2, a message intended for the broker B2 114 first passes through the broker B1 108, so the ingress latency for broker B2 114 is a function of both broker B1 108 and B2 114. An egress latency is computed based on the time to deliver the message from the brokers 108, 114 to the subscribers 118, 120.

Thus, as shown in the example of FIG. 2, a message m1, transmitted at a time t0 from the publisher 102 to the broker 108, has an ingress latency L1$i$ to reach the broker 108. The same message m1 is then relayed by the broker 108 to both the subscriber 118, with an egress latency L1$e$, and another broker 114, with an ingress latency L2$i$. The message m1 is provided by the broker 108 to the subscriber 118 with the egress latency L1$e$ at time t1. The message m1 is also provided by the broker 114 to the subscriber 120 with an egress latency L2$e$ at time t1. Using PoW algorithms, the system 100 can try to ensure that the message m1 reaches both subscribers 118 and 120 at the same time t1, even though the message m1 passes through both brokers B1 108 and B2 114 to reach the subscriber 120. The message m1 routes through B1 108, but not B2 114, to reach the subscriber 118. The PoW algorithm takes into account latency including distance, number of "hops", underlying hardware/software capability, etc., to help ensure fair, approximately equal delivery of message m1 at time t1.

In certain examples, message delivery using broadcast and/or multicast can be fairer than multi-unicast message delivery because radio frequency (RF) waves propagate at the speed of light. Fair multi-unicast delivery is more challenging. For example, multi-unicast can send multiple streams to multiple participants. Unicast is a single message stream to a single recipient. Multi-unicast requires linear scaling of processing power and bandwidth such that the more participants involved, the more servers and bandwidth allocated for the message delivery. Multicasting and/or broadcasting provides streaming messages to a plurality of subscribing recipients. Such messages flood the network and are processed by subscribing participants, for example.

In certain examples, a parallel processing solution is provided including pipelines of message delivery circuits such that the subscriber base can each receive a connection at approximately the same time (e.g., avoiding serialization imposed by sequential schedulers). The message delivery pipelines can be implemented in FPGAs or ASICs, for example. In certain examples, FPGAs have an advantage of being reconfigurable depending on a type of messaging traffic.

As shown in the example of FIG. 2, latency between publisher, subscriber, and broker can be measured and incorporated into a PoW algorithm. If the latency changes, the PoW algorithm can be recalibrated to help ensure a degree of fairness (e.g., assuming a mostly static network topology once the network is configured).

In certain examples, message brokers calculate their PoW function differently based on associated message ingress and egress latencies. An example formula to personalize a PoW for a broker is as follows:

$$L=\max((L1i+L1e),(L2i+L2e),\ldots,c) \quad \text{(Eq. 1)};$$

$$d=\text{difficulty correction} \quad \text{(Eq. 2)};$$

$$D=L\_to\_exp(d+L) \quad \text{(Eq. 3)};$$

$$\text{PoW}=\text{hash}(m1,r)<2^{(256-D)} \quad \text{(Eq. 4)};$$

$$Dx=L\_to\_exp(d+L-(Lxi+Lxe)) \quad \text{(Eq. 5)}.$$

In the equations disclosed and described herein, the PoW (Equation (4)) is a general approach to proof-of-work calculation, and a particular PoWx is implemented specific to a broker x. Latency value L represents a maximum value for an ingress-egress latency for each broker in the network 100. A control value/factor c is used to impose a latency greater than other latencies in the network 100. For example, if a service charges less for delayed ticker quotes, the service can specify a c value that aligns with business objectives. A difficulty correction or adjustment value/factor d is used to correct for processing anomalies that can exist in the computation of the block hash. For example, the brokers 108, 114 may observe that some brokers complete PoW slightly ahead of other brokers. The d correction factor can be selected to correct this behavior such that the brokers complete their PoW at approximately the same time. That is, the difficulty of correction d value can be used to fine-tune message delivery (e.g., account for an externality that cannot be as easily controlled).

In certain examples, L and d can be specified in terms of latency. The PoW computation, however, is realized as a probability of guessing a hash result, which can be expressed in terms of binary exponentiation, for example. For example, given a hash function with $(2^{256}-1)$ bits of hash range and assuming even distribution, the hashed value will have a 50% less probability that its value will be greater than $2^{254}$ and a 50% probability that its value will be less than $2^{254}$. In certain examples, a hashing seed value/factor r is selected (e.g., at random, pseudorandom, within a certain range, etc.) such that a hash of a message with the value r produces a hash result that is less than a work factor threshold (e.g., on average, etc.). In some examples, a checksum, check digits, etc., can be used instead of or in addition to a hash function.

The function L_to_exp converts values expressed in latency to values expressed in exponents (or fractions of exponents, etc.), for example, such that a resulting value D can be used to manipulate a difficulty of finding a suitable hash value, for example. D represents a relationship between the L factor and the d factor. The value Dx is corrected for a specific broker x who's ingress-egress latencies are unique to its position in the blockchain mesh. The work to process is a value less than the slowest broker's ingress-egress constant. Thus, the Dx value subtracts a sum of the broker x node's ingress and egress constants. A node-specific PoW equation can therefore be represented as:

$$\text{PoW}x=\text{hash}(m1,r)<2^{(256-Dx)} \quad \text{(Eq. 6)}.$$

Using the example of Equation (6), the PoW algorithm is a hash of $2^{256-D}$. To calculate work, a value is chosen that matches the constraint of $2^{256-D}$. Each participant is equally burdened with having to guess the result of this hash value, and no one node (e.g., broker 108-116) is advantaged over another. In certain examples, there can be multiple right answers, but each node has to guess a correct value. If a node determines a correct value and the value is less than $2^{256-D}$, then the node has a legitimate PoW result and can continue with processing the transaction. Each node must get a correct result before each node can proceed, but no node can move forward until the right answer is determined. In certain examples, once all nodes determine the correct answer, all nodes can move forward together with message delivery.

Thus, certain examples facilitate publisher-subscriber message passing with fair or equal notification and delivery of messages such that subscribers are made aware of a message or other notification at approximately the same time using a distributed mesh of broker nodes that do not depend on a central authority for time synchronization. For example, a stock ticker application can be facilitated using the broker mesh and equal delivery.

In certain examples, attempts to cheat on behalf of a broker node are discoverable by the remaining blockchain nodes, because a majority (e.g., a 51% majority, a 75% majority, a 100% majority, etc.) must agree the latency computation (e.g., PoW) is accurate. Neighboring broker nodes can each collect statistics regarding the time taken to send/receive messages. Intermediate path latencies depend on all brokers implicated in the path latency to agree on observed latencies over a period of time. As a result, it is difficult for an isolated broker to manipulate ingress latency in a way to disadvantage his neighboring brokers without an agreement to collude. Thus, in some examples, more than 50% of the nodes must collude in order for a malicious broker to skew ingress latency (e.g., assuming all nodes participate including publishers, subscribers and brokers in capturing latency statistics).

Figure 3:
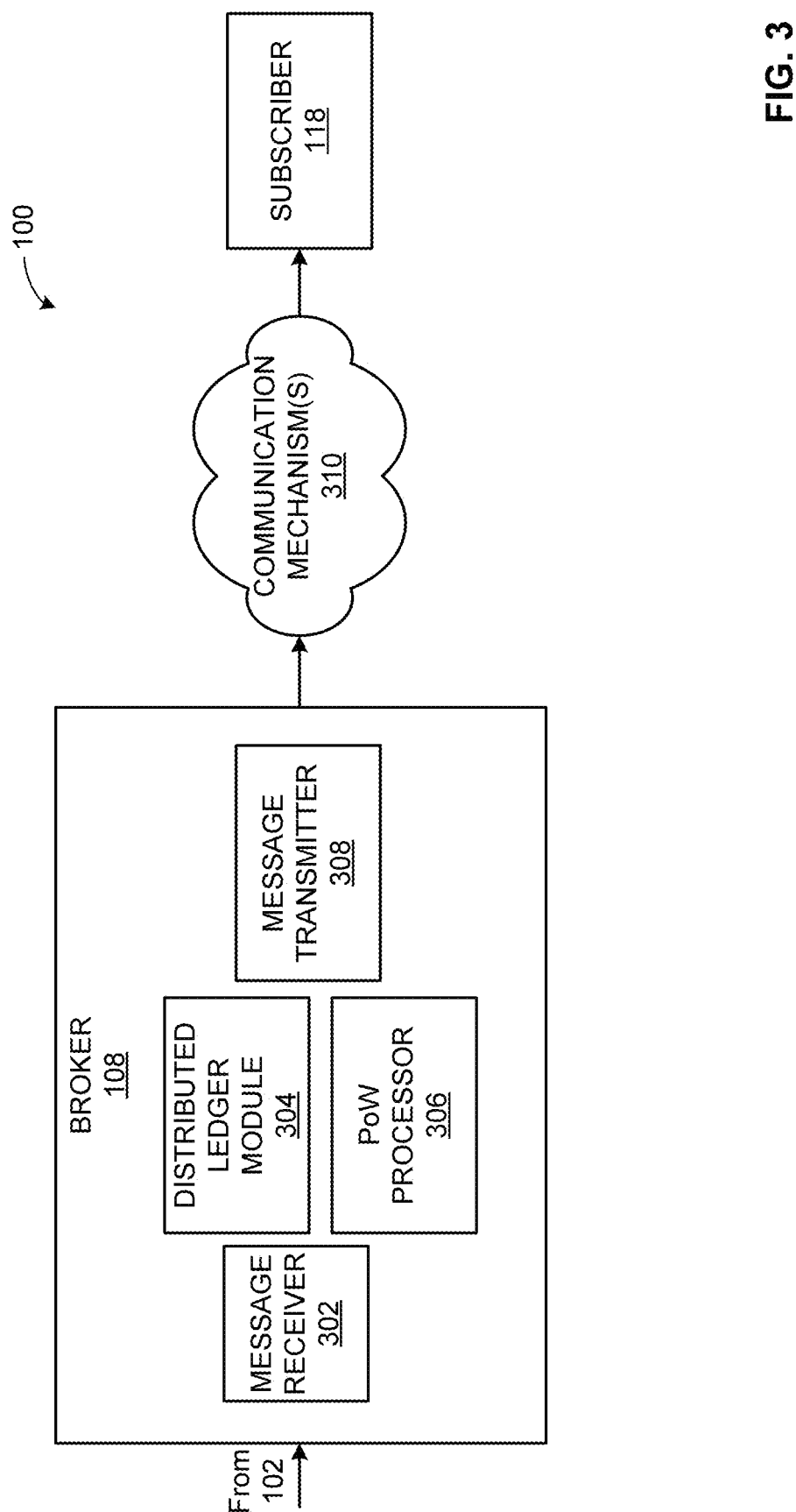
FIG. 3 illustrates an example detailed view of a portion of the network of FIG. 1 including a broker and a subscriber.

FIG. 3 illustrates an example detailed view of a portion of the network 100 including the broker 108 and subscriber 118. In the example of FIG. 3, the broker 108 includes a message receiver 302, a distributed ledger module 304, a PoW processor 306, and a message transmitter 308. A plurality of circuits the same as or similar to the example of FIG. 3 can be instantiated in parallel such that multiple brokers 108-116 can deliver to multiple subscribers 118-122 over parallel pipelines of message delivery circuits (e.g., over the same or similar communication mechanism(s) 310, etc.) to receive connections and message delivery at approximately the same time (e.g., avoiding serialization imposed by sequential schedulers, etc.).

The message receiver 302 receives a message from the publisher 102. The message is stored in the distributed ledger module 304. The contents of the ledger module 304 can be shared among all brokers 108-116 so that each broker 108-116 has a record of each message and/or other transaction facilitated by the broker 108-116 and stored in the ledger module 304, for example.

In certain examples, the distributed ledger module 304 helps to maintain a database and/or other data store that is available to each broker 108-116 across the network 100. The distributed ledger content is stored among many different data stores rather than in a central data store with a master copy. A consensus protocol helps ensure that each copy of the ledger is identical, for example.

For example, a distributed ledger can be implemented using a blockchain-based technology to provide a publicly and/or non-publicly verifiable ledger used to provide messages from publishers 102-106 to subscribers 118-122 via the brokers 108-116 in the example computer network 100. Changes in the distributed ledger (e.g., new messages, etc.) represent messages to be provided to subscribers 118-122. These messages can be added to and/or recorded in the distributed ledger 304.

In certain examples, brokers 108-116 can validate new messages and/or other message updates according to a validation protocol. For example, the validation protocol defines a process by which devices (e.g., brokers 108-122) of the computer network 100 agree on changes and/or additions to the distributed ledger 304. For example, the validation protocol may include the proof-of-work (PoW) protocol and/or other public consensus protocol, private validation protocol, custom validation protocol, etc. The distributed ledger 304 enables brokers 108-122 in the computer network 100 to agree, via the verification protocol, on the validity and timeliness of a message to subscriber(s) 118-122 and/or other additions to the distributed ledger (e.g., to include updates, to delete updates, to reject updates, etc.).

The PoW processor 306 computes a PoW function associated with the broker 108 and/or the particular message, etc. The PoW function can vary based on the capability of the processor 306, the available communication mechanism(s) 310, etc. Once the PoW processor 306 has computed the hash, the hash can be verified by the broker 108 (e.g., based on content in the ledger module 304) and/or other broker 110-116 in the system 100.

Using the PoW processor 306 and the ledger module 304, the PoW for the broker 108 and/or a PoW calculated by another broker 110-116 can be verified. Thus, if a node is attempting to cheat (e.g., by accelerating or bypassing the PoW calculation, etc.), other nodes can detect and send commands to stop the cheat. In certain examples, the PoW calculation can be complicated (e.g., through addition of an r value, d value, c value, etc.) to prevent the broker 108-116 from manipulating the PoW algorithm to relay messages ahead of other brokers 108-116 in the network 100.

After the PoW calculation has been verified, the message can be delivered by the message transmitter 308 to the subscriber 118 via the communication mechanism(s) 310. The example communication mechanism(s) 310 can include a wired communication connection, wireless communication connection (e.g., WiFi, wireless local area network (WLAN), a wireless wide area network (WWAN), near field communication, cellular communication, etc.), and/or other data communication interface, for example.

Figure 4:
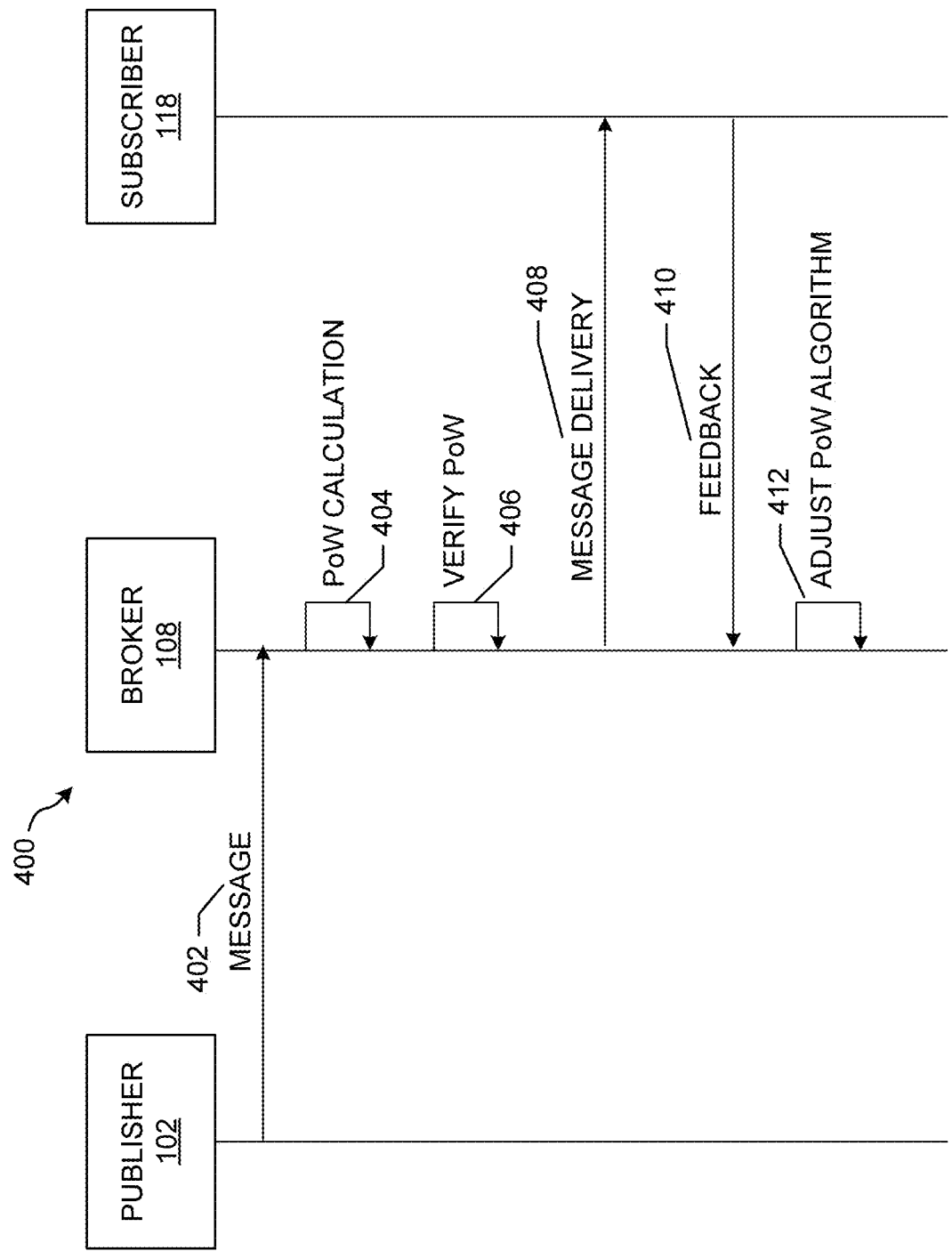
FIG. 4 illustrates a data flow diagram of an example exchange of messages and data among the publisher, broker, and subscriber in the example network of FIGS. 1-3.

FIG. 4 illustrates a data flow diagram of an example exchange 400 of messages and data among the publisher 102, broker 108, and subscriber 118 in the example network 100. At 402, a message is sent from the publisher 102 to the broker 108. For example, a stock quote, a news item, a status update, etc., is provided by the publisher 102 to the broker 108 for delivery to the subscriber 118.

At 404, the PoW calculation is performed. For example, the broker 108 calculates its assigned PoW based on a plurality of factors including an ingress latency of message delivery from the publisher 102 to the broker 108 and an egress latency of message delivery from the broker 108 to the subscriber 118. The PoW calculation is used to help ensure that the brokers 108-116 will deliver messages to subscribers 118-122 at approximately the same time, taking into account ingress and egress latencies with respect to the brokers 108-116 for message delivery.

At 406, after the PoW calculation has been completed, the PoW calculation is verified. The broker 108 and/or another broker 110-116 can verify the hash result of the PoW calculation, for example. The length and/or other complexity of the PoW calculation can vary depending upon latency, broker 108 capability, subscriber 118 capability, communication mechanism 310, etc.

At 408, the message is delivered by the broker 108 to the subscriber 118 upon completion and verification of the PoW calculation. For example, the PoW hash is computed and verified to help ensure equal time in delivering a message from broker 108-116 to subscriber 118-122. Thus, each subscriber 118-122 receives the message from its respective broker 108-116 at approximately the same time after verification of the PoW calculation. As described above, each broker 108-116 can have a different PoW calculation based on its processing capability, communication latency, and/or other environmental condition to help ensure that a more able broker 108-116 is not able to provide its subscriber(s) 118-122 with information faster than a less capable broker 108-116. The PoW calculation helps to equalize the playing field among the subscribers 118-122 and their access to timely information, for example.

At 410, feedback is provided based on the message communication between the subscriber 118 and the broker 108. For example, a performance metric can be computed and provided to the broker 108 based on computation of the PoW function, egress latency, ingress latency, and/or other message/communication evaluation metric. Alternatively or in addition, the egress latency and/or ingress latency can be measured, and a change in the latency can be noted, quantified, reported, etc.

At 412, the PoW algorithm can be adjusted based on the feedback. For example, a difficulty correction factor, d, a random adjustment factor, r, and/or a control value, c, can be added, removed, adjusted, etc., based on an increase or decrease in message delivery time (e.g., egress and/or ingress latency) to the subscriber 118. In certain examples, system 100 behavior can be monitored over a period of time (e.g., a day, a week, several weeks, etc.) to determine whether a correction factor (e.g., d, r, c, etc.) is warranted and to what extent the correction factor is to be applied. For example, if a broker 108-116 completes its PoW more quickly than others, the difficulty correction factor d can be applied to correct for the disparity. In certain examples, the PoW algorithm for a given broker 108-116 is jointly approved by all the brokers 108-116, so the generation and application of the difficulty correction factor d to a particular broker 1-8-116 is a collective decision among the brokers 108-116.

In certain examples, performance metric(s) (e.g., information regarding the broker's 108-116 ability to compute the PoW function, communication the message, etc.) are collected and evaluated to measure a change since the last measure. If the performance metrics have changed (e.g., by more than a certain percentage, greater than or less than a certain threshold, outside a range, etc.), then the PoW is recalculated for each peer broker node 108-116 to determine an updated ingress and egress latency metric for each peer node 108-117. An average latency can be multiplied by a weighting factor and used to compute a PoW for each broker node 108-116. Each broker 108-116 determines a latency L value that is agreed upon by the other broker nodes 108-116. If nodes 108-116 determine different L values, over time this difference is noticed and flagged to trigger application of a difficulty correction factor d, for example. If a node's median PoW varies over a period of time, the d value can be increased or decreased to re-calibrate the PoW algorithm until the PoW algorithm is balanced (e.g., incremental over time for each node with no central authority dictating d values for everyone, etc.). Thus, stock tickers, news outlets, sports organizations, publishers, etc., can regulate and distribute messages to arrive at subscribers 118-112 at a certain time.

Thus, certain examples provide improved overall system performance. Certain examples facilitate improved message delivery and equalization of message delivery timing to subscribers regardless of the particular broker. Certain examples facilitate delivery of a better usage experience to users of the platform 100.

While example implementations of the system 100, the publishers 102-106, the brokers 108-116, the subscribers 119-122, the message receiver 302, the distributed ledger module 304, the PoW processor 306, the message transmitter 308, the communication mechanism(s) 310, etc., are illustrated in FIGS. 1-4, one or more of the elements, processes and/or devices illustrated in FIGS. 1-4 may be combined, divided, re-arranged, omitted, eliminated and/or implemented in any other way. Further, the example publishers 102-106, brokers 108-116, subscribers 119-122, message receiver 302, distributed ledger module 304, PoW processor 306, message transmitter 308, communication mechanism(s) 310, and/or, more generally, the example system 100 of FIGS. 1-4 can be implemented by hardware, software, firmware and/or any combination of hardware, software and/or firmware. Thus, for example, any of the example publishers 102-106, brokers 108-116, subscribers 119-122, message receiver 302, distributed ledger module 304, PoW processor 306, message transmitter 308, communication mechanism(s) 310, and/or, more generally, the example system 100 of FIGS. 1-4 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example publishers 102-106, brokers 108-116, subscribers 119-122, message receiver 302, distributed ledger module 304, PoW processor 306, message transmitter 308, communication mechanism(s) 310, and/or, more generally, the example system 100 of FIGS. 1-4 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-4 may include one or more elements, processes and/or devices in addition to, or instead of, those illustrated in FIGS. 1-4, and/or may include more than one of any or all of the illustrated elements, processes and devices.

Figure 5:
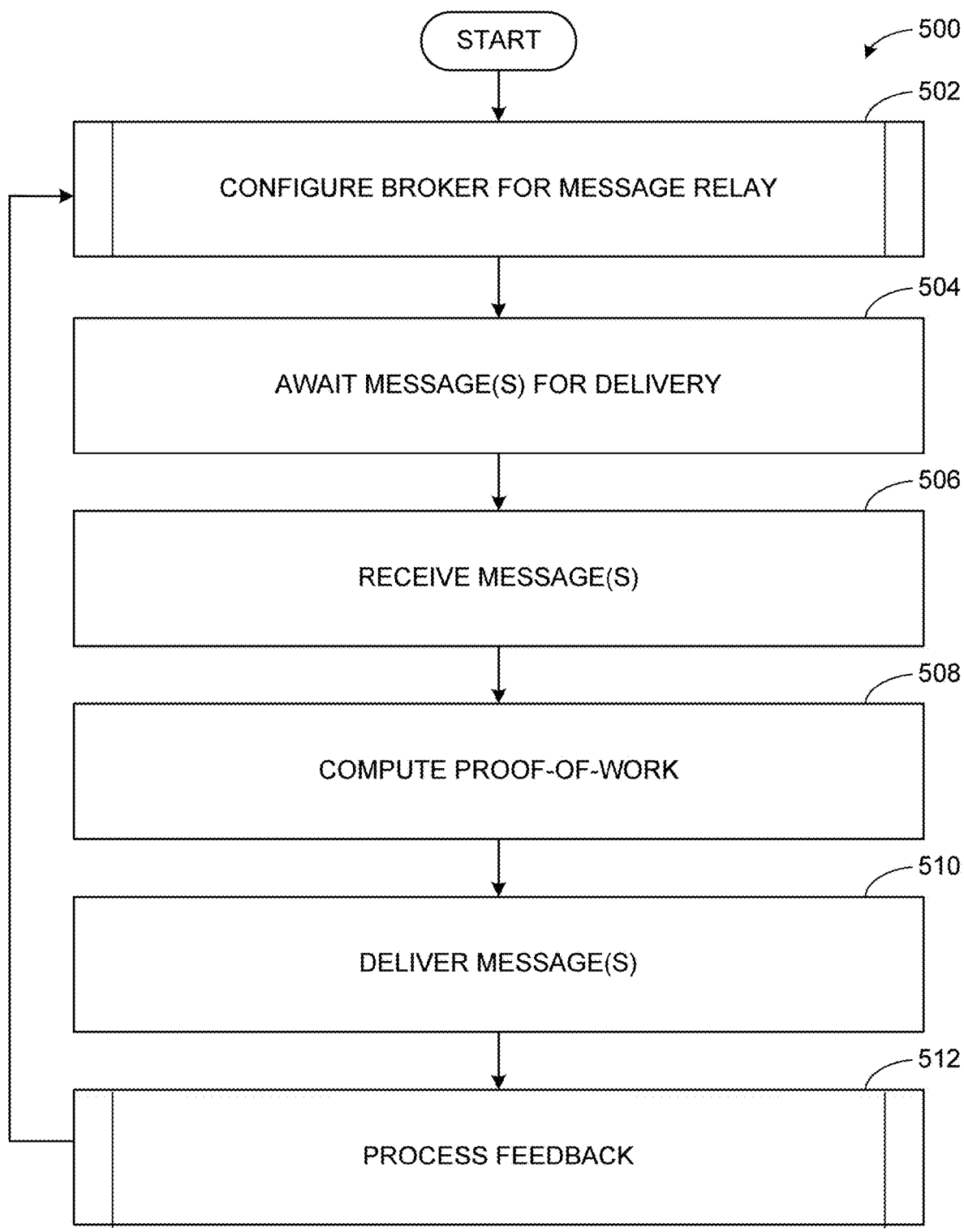
FIGS. 5-7 illustrate flow diagrams representative of example machine readable instructions that can be executed to implement the example systems of FIGS. 1-4.
Figure 6:
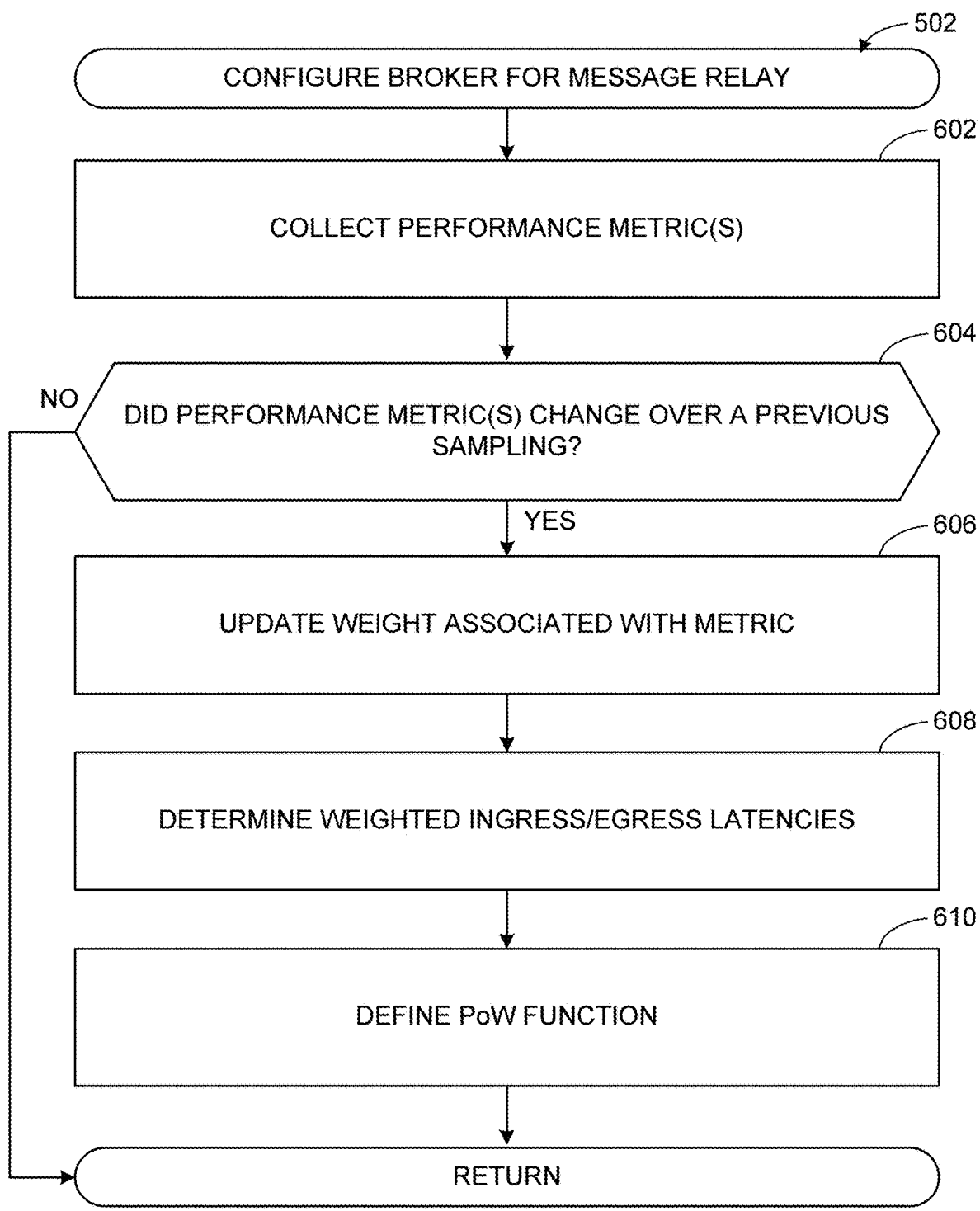
Figure 7:
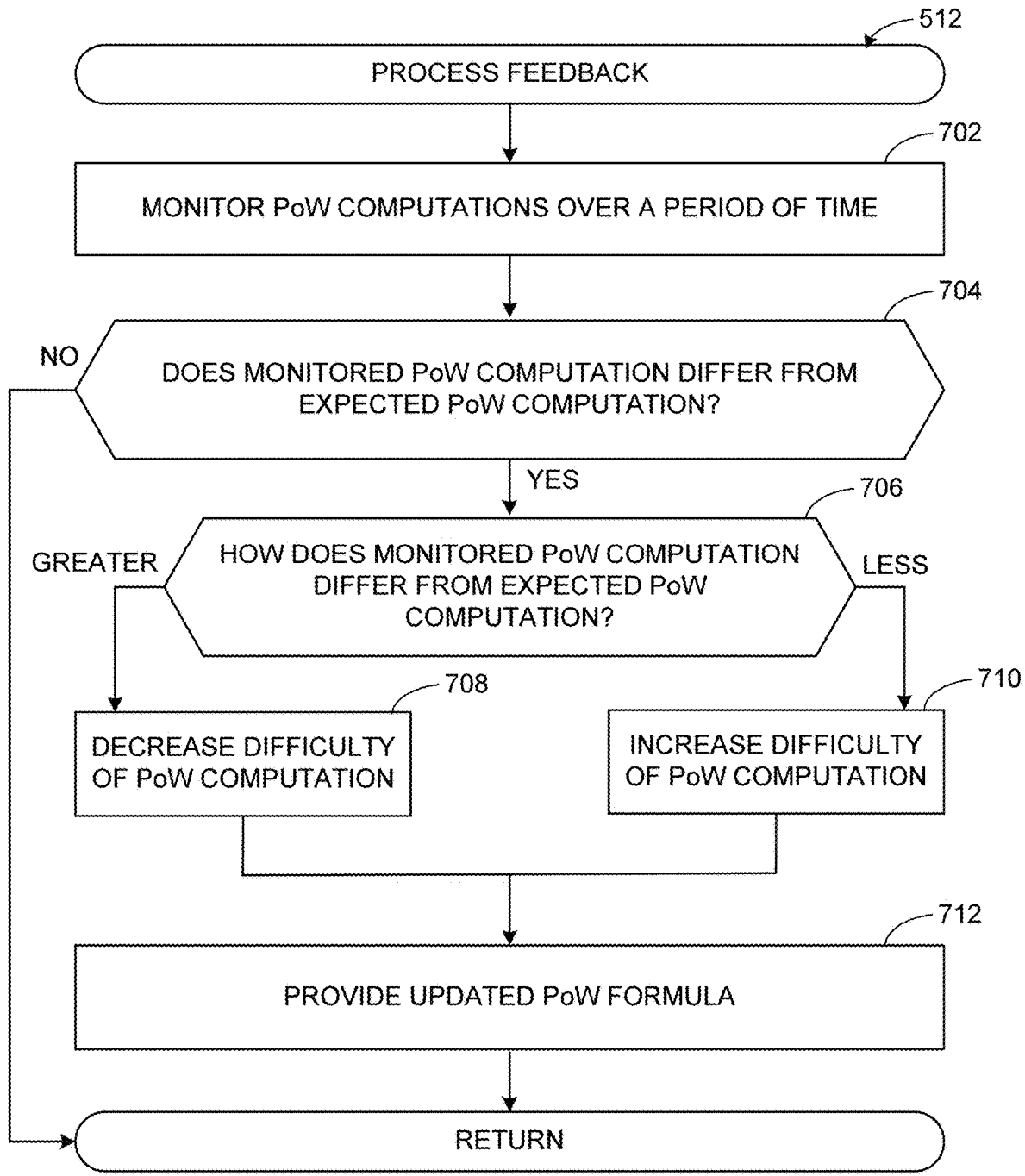

Flowcharts representative of example machine readable instructions for implementing the system 100 of FIGS. 1-4 are shown in FIGS. 5-7. In these examples, the machine readable instructions comprise a program for execution by a processor such as the processor 812 shown in the example processor platform 800 discussed below in connection with FIG. 12. The program may be embodied in software stored on a tangible computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowcharts illustrated in FIGS. 5-7, many other methods of implementing the example system 100 may alternatively be used. For example, the order of execution of the blocks may be changed, and/or some of the blocks described may be changed, eliminated, or combined.

As mentioned above, the example processes of FIGS. 5-7 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 500 of FIG. 5 begins at block 502. At block 502, the broker 108-116 is configured for message relay. For example, performance metric(s) can be collected for a processor, storage, network, FPGA, power management, and/or other subsystem that can affect the broker's ability to process a PoW function. The generated performance metric(s) can be evaluated to determine whether a performance metric changed over a previous sampling (e.g., did the performance metric captured at time t1 differ from the performance metric captured at time t0, etc.). If the metric did change, then a weight W (e.g., a performance weight) associated with the metric can be updated. Otherwise, the performance metric remains the same. Weighted ingress and egress latencies can be determined for each peer broker node 108-116 (e.g., L1$i$, L2$i$, L1$e$, L2$e$, etc.). In certain examples, a weighted latency (e.g., ingress or egress) is determined or predicted by multiplying an average measured/observed latency by the assigned weight W. In certain examples, using the weighted latency, the PoW function can be defined as in Equations (1-6) described above.

At block 504, the broker 108-116 awaits a message for delivery. For example, the broker 108-116 monitors for an incoming message from the publisher 102-106. At block 506, the broker 108-116 receives message(s) from the associated publisher 102-106. Receipt of the message(s) triggers execution of the PoW computation by the broker 108-116. The broker 108-116 can receive one or more messages intended for one or more recipients (e.g., on a per-message and/or parallel pipelined message delivery, etc.).

At block 508, the broker 108-116 performs the PoW function to determine a result. The result can be verified by the broker 108-116 performing the PoW calculation and/or by another broker 108-116 monitoring the result, for example. Thus, the hash value can be computed according to the PoW algorithm and compared to a result.

At block 510, following completion of the PoW execution, the message is delivered by the broker 108-116 to its subscriber 118-122. For example, after successful completion of the PoW calculation, the broker 108-116 delivers the message to a corresponding subscriber 118-122. In some examples, such as the example of FIG. 1, the broker 108-116 (also referred to as a relay) delivers the message to another broker 108-116, which then delivers the message to the subscriber 118-122 after its PoW calculation. Thus, the PoW calculation can take into consideration how many brokers (e.g., how many communication segments or legs) are involved to provide the message from the publisher 102-106 to the subscriber 118-122, for example.

In certain examples, a broker 108-116 provides a timestamp with the message attesting that a PoW has been performed by that node. If a message is relayed via multiple broker nodes 108-116, then the message may arrive at the subscriber 118-122 with a plurality of timestamp notifications.

At block 512, any feedback received is processed by the broker 108-116. For example, the broker 108-116 can receive feedback from the subscriber 118-122 based on the received message, timestamp(s), egress latency, etc. The broker 108-116 can receive feedback from the publisher 102-106 and/or another broker 108-116 regarding message, timestamp(s), ingress latency, PoW calculation, etc. The broker 108-116 can provide its own feedback regarding latency, timestamp(s), PoW calculation, etc.

In certain examples, the PoW for the broker 108-116 can be adjusted based on the feedback. For example, the feedback can be monitored over a period of time and evaluated to determine whether the difficulty of the PoW calculation should decrease (e.g., by decreasing the difficulty correction factor d based on an evaluation that the node's median PoW computation over a two week period was greater than an expected PoW, etc.) or increase (e.g., by increasing the difficulty correction factor d based on an evaluation that the node's median PoW computation over a two week period was less than an expected PoW, etc.).

Additional detail associated with configuring the broker 108-116 for message relay (block 502) is shown in the example of FIG. 6. At block 602 in the illustrated example of FIG. 6, performance metric data is collected with respect to the broker 108-116. For example, performance metric(s) can be collected for a processor, storage, network, FPGA, power management, and/or other subsystem that can affect the broker's ability to process a PoW function.

At block 604, The generated performance metric(s) can be evaluated to determine whether a performance metric changed over a previous sampling (e.g., did the performance metric captured at time t1 differ from the performance metric captured at time t0, etc.). If the metric did not change (or changed within a certain margin of error or tolerance, etc.), the performance metric remains the same.

At block 606, if the metric did change, then a weight W (e.g., a performance weight) associated with the metric is updated (e.g., W=Wnew, etc.). At block 608, weighted ingress and egress latencies can be determined for each peer broker node 108-116 (e.g., L1$i$, L2$i$, L1$e$, L2$e$, etc.). In certain examples, a weighted latency (e.g., ingress or egress) is determined or predicted by multiplying an average measured/observed latency by the assigned weight W.

For example, ingress and egress latency measurements can be obtained from a trusted execution environment (TEE) that enables measurement of data traffic via a processor interface to determine a length, delay, or latency of data (e.g., message) delivery. Ingress and egress latency measurements can be added to a blockchain PoW formula to vary the PoW formula based on how large or small the latency(-ies) are for a particular broker 108-116 node, for example.

At block 610, the PoW function is defined. In certain examples, using the weighted latency, the PoW function can be defined as in Equations (1-6) described above. At block 612, the PoW function is provided for use by the broker 108-116 once a message is received (e.g., control returns to block 504 to await receipt of a message for delivery, etc.).

Thus, performance metrics impacting a node's ability to compute the PoW function are collected and evaluated to identify a change. If the metric(s) have changed (e.g., more than a certain tolerance or other amount, etc.), then a performance weight value is recalculated. In certain examples, the weight W is recalculated for each peer node (e.g., each broker 108-116), and ingress and egress latency metrics are determined for each peer node. An average latency for each broker 108-116 is determined and multiplied by the updated weighting factor W, which can then be used to compute PoW for each node 108-116.

Additional detail associated with processing feedback (block 512) is shown in the example of FIG. 7. At block 702 in the illustrated example of FIG. 7, PoW computations are monitored over a period of time. For example, PoW calculations from one or more brokers 108-116 are monitored over a time period (e.g., one week, two weeks, two days, etc.).

At block 704, the monitored PoW computation information is evaluated with respect to an expected PoW computation. For example, the broker processes the PoW computation information and/or other feedback to determine whether the PoW information is within a margin of error/tolerance. If so, then no correction is warranted. If the PoW information is outside the margin of error/tolerance, then, at block 706, difference between the observed Pow computation information and the expected PoW computation is quantified for adjustment.

At block 706, if the computed PoW information is greater than the expected PoW, then, at block 708, a difficulty of the PoW computation is decreased. For example, the difficulty correction factor d can be decreased based on an evaluation that the node's median PoW computation time over a two week period was greater than an expected PoW computation time. However, if the computed PoW computation time is less than the expected PoW computation, then, at block 710, the difficulty of the PoW computation is increased. For example, the difficulty correction factor d can be increased based on an evaluation that the node's median PoW computation time over a two week period was less than an expected PoW computation time. At block 712, the updated PoW formula is provided.

Thus, in certain examples, each broker node 108-116 can determines an L value, and multiple brokers 108-116 can check to determine whether they agree with the L value. If different brokers 108-116 calculate different L values that are not agreed upon by other brokers 108-116, then this triggers an alert or a "red flag" that can be noticed over time. Upon noting such a disparity, a correction to the d difficulty factor can be applied to the PoW function as a built-in check or balance to help ensure fair and equal message delivery to the subscribers 118-122.

Thus, certain examples facilitate fair information exchange in a publish-subscribe network using blockchain technology. Certain examples leverage PoW functions to equalize message delivery times to subscribers based on hardware and/or software capabilities, limitations, latencies, etc. In certain examples, other consensus mechanisms can be used instead of or in addition to PoW. For example, proof of stake, proof of activity, proof of burn, proof of capacity, etc., can be used as a substitute to equalize brokers 108-116 by delaying more capable brokers and accelerating less capable brokers to try and harmonize message delivery from the brokers 108-116 to the subscribers 118-122.

Figure 8:
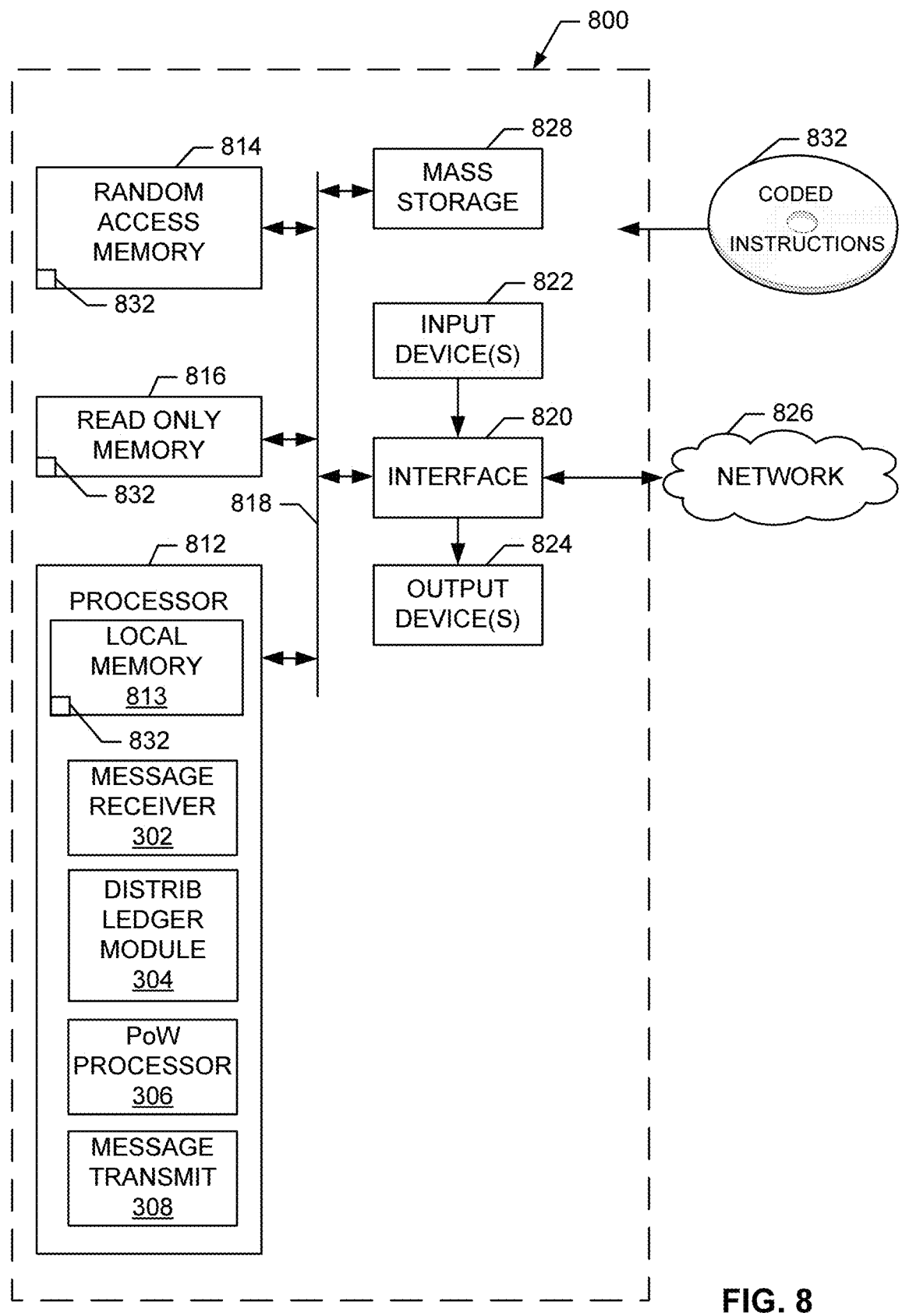
FIG. 8 is a schematic illustration of an example processor platform that may execute the instructions of FIGS. 5-7 to implement the example systems of FIGS. 1-4.

FIG. 8 is a block diagram of an example processor platform 800 capable of executing the instructions of FIGS. 5-7 to implement the systems of FIGS. 1-4. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example, the processor 812 is structured to include the example message receiver 302, distributed ledger module 304, PoW processor 306, message transmitter 308, etc.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM), 3D XPoint (such as Intel Optane™, Micron QuantX™, etc.) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, one or more input devices 822 are connected to the interface circuit 820. The input device(s) 822 permit(s) a user to enter data and commands into the processor 812. The input device(s) 822 can be implemented by, for example, an audio sensor, a microphone, a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture facilitate monitoring and management of resource usage in a computing platform. In certain examples, rather than focusing on the processor (e.g., the SOC), the whole computing platform (e.g., the ROP) is monitored and managed for resource rebalancing based on the current snapshot of system usage (e.g., the system usage scenario quantified by the system usage scenario index or SUSI). Certain examples facilitate dynamic adjustment of power and/or other system resources based on a change in usage scenario (e.g., a change that exceeds a threshold, etc.).

Example 1 is an apparatus including a broker including a processor and a distributed ledger module, the distributed ledger module to store a message to be relayed by the broker from a publisher to a subscriber. The processor, when in operation, is to at least: compute, triggered by receipt of the message by the broker, a proof-of-work (PoW) function; verify the computation of the PoW function; transmit, upon verifying the computation of the PoW function, the message to the subscriber; and process feedback received by the broker to update the PoW function.

Example 2 includes the subject matter of claim 1, wherein the PoW function includes a hash of the message and a hashing seed value in comparison to a latency value for the broker.

Example 3 includes the subject matter of claim 2, wherein the latency value for the broker includes a combination of an ingress latency and an egress latency for the broker.

Example 4 includes the subject matter of claim 2, wherein the processor is to verify the computation of the PoW function by verifying the comparison of the hash and the latency value.

Example 5 includes the subject matter of claim 4, wherein the broker is a first broker, and a second broker verifies the computation of the PoW function for the first broker.

Example 6 includes the subject matter of claim 1, wherein the processor is to add a result of the computation of the PoW function to the distributed ledger module.

Example 7 includes the subject matter of claim 1, wherein the processor is to configure the broker for message relay.

Example 8 includes the subject matter of claim 7, wherein the processor is to configure the broker for message relay by: collecting a performance metric with respect to the broker; determining a weight value based on the performance metric; determining an ingress latency and an egress latency for the broker; and defining the PoW function based on the weight value, the ingress latency, and the egress latency.

Example 9 includes the subject matter of claim 1, wherein the processor is to process feedback by comparing a measured time associated with the computation of the PoW function to an expected time.

Example 10 includes the subject matter of claim 9, wherein, when the measured time exceeds the expected time, a difficulty of the PoW function is decreased by a difficulty correction factor, and, when the expected time exceeds the measured time, the difficulty of the PoW function is increased by the difficulty correction factor.

Example 11 is a method of relaying a message from a publisher to a subscriber via a broker, the broker including a processor and a distributed ledger module, the distributed ledger module to store a message to be relayed by the broker from a publisher to a subscriber. The example method includes computing, using the processor triggered by receipt of the message by the broker, a proof-of-work (PoW) function; verifying, using the processor, the computation of the PoW function; transmitting, using the processor upon verifying the computation of the PoW function, the message to the subscriber; and processing, using the processor, feedback received by the broker to update the PoW function.

Example 12 includes the subject matter of claim 11, wherein the PoW function includes a hash of the message and a hashing seed value in comparison to a latency value for the broker.

Example 13 includes the subject matter of claim 12, wherein the latency value for the broker includes a combination of an ingress latency and an egress latency for the broker.

Example 14 includes the subject matter of claim 12, wherein verifying the computation of the PoW function further includes verifying the comparison of the hash and the latency value.

Example 15 includes the subject matter of claim 14, wherein the broker is a first broker, and a second broker verifies the computation of the PoW function for the first broker.

Example 16 includes the subject matter of claim 11, further including adding a result of the computation of the PoW function to the distributed ledger module.

Example 17 includes the subject matter of claim 11, further including configuring the broker for message relay.

Example 18 includes the subject matter of claim 17, wherein configuring the broker for message relay further includes: collecting a performance metric with respect to the broker; determining a weight value based on the performance metric; determining an ingress latency and an egress latency for the broker; and defining the PoW function based on the weight value, the ingress latency, and the egress latency.

Example 19 includes the subject matter of claim 11, wherein processing feedback further includes comparing a measured time associated with the computation of the PoW function to an expected time.

Example 20 includes the subject matter of claim 19, wherein, when the measured time exceeds the expected time, a difficulty of the PoW function is decreased by a difficulty correction factor, and, when the expected time exceeds the measured time, the difficulty of the PoW function is increased by the difficulty correction factor.

Example 21 is a tangible computer readable storage medium comprising computer readable instructions which, when executed, cause a processor to at least implement a method of relaying a message from a publisher to a subscriber via a broker, the broker including the processor and a distributed ledger module, the distributed ledger module to store a message to be relayed by the broker from a publisher to a subscriber. The example method includes: computing, triggered by receipt of the message by the broker, a proof-of-work (PoW) function; verifying the computation of the PoW function; transmitting, upon verifying the computation of the PoW function, the message to the subscriber; and processing feedback received by the broker to update the PoW function.

Example 22 includes the subject matter of claim 21, wherein the PoW function includes a hash of the message and a hashing seed value in comparison to a latency value for the broker.

Example 23 includes the subject matter of claim 22, wherein the latency value for the broker includes a combination of an ingress latency and an egress latency for the broker.

Example 24 includes the subject matter of claim 22, wherein the processor is to verify the computation of the PoW function by verifying the comparison of the hash and the latency value.

Example 25 includes the subject matter of claim 24, wherein the broker is a first broker, and a second broker verifies the computation of the PoW function for the first broker.

Example 26 includes the subject matter of claim 21, wherein the processor is to add a result of the computation of the PoW function to the distributed ledger module.

Example 27 includes the subject matter of claim 21, wherein the processor is to configure the broker for message relay.

Example 28 includes the subject matter of claim 27, wherein the processor is to configure the broker for message relay by: collecting a performance metric with respect to the broker; determining a weight value based on the performance metric; determining an ingress latency and an egress latency for the broker; and defining the PoW function based on the weight value, the ingress latency, and the egress latency.

Example 29 includes the subject matter of claim 21, wherein the processor is to process feedback by comparing a measured time associated with the computation of the PoW function to an expected time.

Example 30 includes the subject matter of claim 29, wherein, when the measured time exceeds the expected time, a difficulty of the PoW function is decreased by a difficulty correction factor, and, when the expected time exceeds the measured time, the difficulty of the PoW function is increased by the difficulty correction factor.

Example 31 includes the subject matter of any of claims 21-30, wherein the message includes time-sensitive information of a value that degrades over time.

Example 32 includes the subject matter of any of claims 21-30, wherein the distributed ledger module implements a blockchain.

Example 33 includes the subject matter of any of claims 1-10, wherein the message includes time-sensitive information of a value that degrades over time.

Example 34 includes the subject matter of any of claims 1-10, wherein the distributed ledger module implements a blockchain.

Example 35 includes the subject matter of any of claims 11-20, wherein the message includes time-sensitive information of a value that degrades over time.

Example 36 includes the subject matter of any of claims 11-20, wherein the distributed ledger module implements a blockchain.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first broker apparatus comprising:
   memory including a distributed ledger to store a message to be relayed from a publisher to a first subscriber; and
   a processor to at least:
      compute, triggered by receipt of the message, a proof-of-work (PoW) function, the PoW function defined based on a latency value associated with the first broker apparatus, to synchronize timing of a) delivery of the message from the first broker apparatus to the first subscriber with b) delivery of the message from a second broker apparatus to a second subscriber;
      verify the computation of the PoW function;
      transmit, upon verifying the computation of the PoW function, the message to the first subscriber; and
      process feedback to update the PoW function.

2. The apparatus of claim 1, wherein the PoW function includes a hash of the message and a hashing seed value in comparison to the latency value for the first broker apparatus.

3. The apparatus of claim 2, wherein the latency value for the first broker apparatus includes a combination of an ingress latency and an egress latency for the first broker apparatus.

4. The apparatus of claim 2, wherein the processor is to verify the computation of the PoW function by verifying the comparison of the hash and the latency value.

5. The apparatus of claim 4, wherein a third broker is to verify the computation of the PoW function for the first broker apparatus.

6. The apparatus of claim 1, wherein the processor is to add a result of the computation of the PoW function to the distributed ledger.

7. The apparatus of claim 1, wherein the processor is to configure the first broker apparatus for message relay.

8. The apparatus of claim 7, wherein the processor is to configure the first broker apparatus for message relay by:
   collecting a performance metric with respect to the first broker apparatus;
   determining a weight value based on the performance metric;
   determining an ingress latency and an egress latency for the first broker apparatus; and
   defining the PoW function based on the weight value, the ingress latency, and the egress latency.

9. The apparatus of claim 1, wherein the processor is to process feedback by comparing a measured time associated with the computation of the PoW function to an expected time.

10. The apparatus of claim 9, wherein, when the measured time exceeds the expected time, a difficulty of the PoW function is decreased by a difficulty correction factor, and, when the expected time exceeds the measured time, the difficulty of the PoW function is increased by the difficulty correction factor.

11. A method of relaying a message from a publisher to a subscriber via a first broker, the first broker including a processor and memory including a distributed ledger, the distributed ledger to store a message to be relayed by the first broker from a publisher to a first subscriber, the method comprising:
   computing, using the processor triggered by receipt of the message by the first broker, a proof-of-work (PoW) function, the PoW function, defined based on a latency value associated with the first broker, to synchronize timing of a) delivery of the message from the first broker to the first subscriber with b) delivery of the message from a second broker to a second subscriber;

verifying, using the processor, the computation of the PoW function;

transmitting, using the processor upon verifying the computation of the PoW function, the message to the first subscriber; and processing, using the processor, feedback received by the first broker to update the PoW function.

12. The method of claim 11, wherein computing the PoW function includes computing a hash of the message and a hashing seed value in comparison to the latency value for the first broker.

13. The method of claim 12, wherein computing the PoW function includes combining an ingress latency and an egress latency to determine the latency value for the first broker.

14. The method of claim 12, wherein verifying the computation of the PoW function further includes verifying the comparison of the hash and the latency value.

15. The method of claim 14, wherein verifying the computation of the PoW function includes using a third broker to verify the computation of the PoW function for the first broker.

16. The method of claim 11, further including adding a result of the computation of the PoW function to the distributed ledger.

17. The method of claim 11, wherein configuring the first broker for message relay further includes:
collecting a performance metric with respect to the first broker;
determining a weight value based on the performance metric;
determining an ingress latency and an egress latency for the first broker; and
defining the PoW function based on the weight value, the ingress latency, and the egress latency.

18. The method of claim 11, wherein processing feedback further includes comparing a measured time associated with the computation of the PoW function to an expected time.

19. The method of claim 18, wherein processing includes, when the measured time exceeds the expected time, decreasing a difficulty of the PoW function by a difficulty correction factor, and, when the expected time exceeds the measured time, increasing the difficulty of the PoW function by the difficulty correction factor.

20. A tangible computer readable storage medium comprising computer readable instructions which, when executed, cause a processor to at least implement a method of relaying a message from a publisher to a subscriber via a first broker, the first broker including the processor and a distributed ledger, the distributed ledger to store a message to be relayed by the first broker from a publisher to a first subscriber, the method comprising:
computing, triggered by receipt of the message by the first broker, a proof-of-work (PoW) function, the PoW function, defined based on a latency value associated with the first broker, to synchronize timing of a) delivery of the message from the first broker to the first subscriber with b) delivery of the message from a second broker to a second subscriber;
verifying the computation of the PoW function;
transmitting, upon verifying the computation of the PoW function, the message to the subscriber; and
processing feedback received by the first broker to update the PoW function.

21. The storage medium of claim 20, wherein the PoW function includes a hash of the message and a hashing seed value in comparison to the latency value for the first broker.

22. The storage medium of claim 21, wherein the latency value for the first broker includes a combination of an ingress latency and an egress latency for the first broker.

23. The storage medium of claim 21, wherein the processor is to verify the computation of the PoW function by verifying the comparison of the hash and the latency value.

24. The storage medium of claim 23, wherein a third broker verifies the computation of the PoW function for the first broker.

25. The storage medium of claim 20, wherein the processor is to add a result of the computation of the PoW function to the distributed ledger.

26. The storage medium of claim 20, wherein the processor is to configure the first broker for message relay.

27. The storage medium of claim 26, wherein the processor is to configure the first broker for message relay by:
collecting a performance metric with respect to the first broker;
determining a weight value based on the performance metric;
determining an ingress latency and an egress latency for the first broker; and
defining the PoW function based on the weight value, the ingress latency, and the egress latency.

28. The storage medium of claim 20, wherein the processor is to process feedback by comparing a measured time associated with the computation of the PoW function to an expected time.

29. The storage medium of claim 28, wherein, when the measured time exceeds the expected time, a difficulty of the PoW function is decreased by a difficulty correction factor, and, when the expected time exceeds the measured time, the difficulty of the PoW function is increased by the difficulty correction factor.

30. The storage medium of claim 20, wherein the message includes time-sensitive information of a value that degrades over time.

31. The storage medium of claim 20, wherein the distributed ledger implements a blockchain.

32. The apparatus of claim 1, wherein the message includes time-sensitive information of a value that degrades over time.

33. The apparatus of claim 1, wherein the distributed ledger implements a blockchain.

34. The apparatus of claim 1, wherein the processor is to compute the PoW function to synchronize delivery of the message from the first broker apparatus to the first subscriber at a first delivery time with delivery of the message from the second broker apparatus to a second subscriber at the first delivery time.

35. The method of claim 11, further including storing the message in a blockchain implemented by the distributed ledger.

* * * * *